United States Patent [19]

Peters

[11] 3,996,965
[45] Dec. 14, 1976

[54] PILOT VALVE MECHANISM FOR HIGH OR LOW PRESSURE CUTOFF CONTROL

[76] Inventor: Clifford M. Peters, 1407 Pentecost Road, Kilgore, Tex. 75662

[22] Filed: Mar. 21, 1975

[21] Appl. No.: 560,598

Related U.S. Application Data

[63] Continuation of Ser. No. 410,182, Oct. 26, 1973, abandoned.

[52] U.S. Cl. .................... 137/625.66; 137/596.18; 251/DIG. 1
[51] Int. Cl.² ........................................ F16K 11/02
[58] Field of Search ........ 137/458, 596.18, 625.27, 137/625.66, 625.5; 251/61.3, 63.5, 357, DIG. 1; 277/198

[56] References Cited

UNITED STATES PATENTS

| 2,931,673 | 4/1960 | Gondek | 251/DIG. 1 |
|---|---|---|---|
| 2,966,891 | 1/1961 | Williams | 137/625.66 X |
| 3,043,331 | 7/1962 | Peters | 137/458 |
| 3,194,266 | 7/1965 | Abbott et al. | 137/596.16 |
| 3,612,479 | 10/1971 | Smith | 251/DIG. 1 |
| 3,621,881 | 11/1971 | Vicari | 137/625.66 |
| 3,791,398 | 2/1974 | Vickery | 137/625.66 |
| 3,888,457 | 6/1975 | Taylor | 137/625.5 X |
| R24,440 | 3/1958 | Groen | 277/198 UX |

FOREIGN PATENTS OR APPLICATIONS

| 1,273,005 | 4/1961 | France | 137/625.66 |
|---|---|---|---|
| 1,119,227 | 6/1956 | France | 251/357 |
| 1,387,805 | 12/1964 | France | 251/DIG. 1 |
| 622,016 | 6/1961 | Italy | 251/DIG. 1 |
| 897,054 | 5/1962 | United Kingdom | 251/DIG. 1 |
| 876,985 | 9/1961 | United Kingdom | 251/DIG. 1 |

*Primary Examiner*—Alan Cohan
*Assistant Examiner*—Gerald A. Michalsky
*Attorney, Agent, or Firm*—Bard, Springs & Jackson

[57] ABSTRACT

A pilot valve mechanism for controlling the flow of a pressure medium responsive to predetermined variations in a pressurized system. The pilot valve mechanism is constructed in such manner that a plurality of pilot valves may be connected in assembly and may be operative to shut down operation of a flow system responsive to sensing of pressures that are above or below a predetermined range of operating pressure.

Each of the valves may include a shuttle valve mechanism capable of interrupting fluid communication between the inlet and outlet of the pilot valve mechanism or between the outlet and vent of the valve assembly, depending upon the position of a shuttle valve actuating piston that is proportionally movable responsive to variations in the pressure that is sensed by the pilot valve mechanism. Movement of the piston and shuttle valve to the various positions thereof may be controlled by an urging means that may be adjustably preset for a particular high or low pressure. The shuttle valve may incorporate annular end seals that are retained in assembly with the shuttle valve and engage annular seal surfaces, defined within the valve body of the valve assembly, to control fluid communication between the various ports. Slight movement of the end seals of the shuttle valve away from the annular sealing surfaces affords substantial cross-sectional flow area for large volume flow, thus providing for rapid pressure responsive actuation. Utilization of piston sealing elements having low friction characteristics and utilization of a tension spring for urging the shuttle valve and piston between operative positions thereof, facilitates accurate operation of the pilot valve mechanism at relatively narrow pressure differentials.

12 Claims, 13 Drawing Figures

PILOT VALVE MECHANISM FOR HIGH OR LOW PRESSURE CUTOFF CONTROL

This is a continuation of application Ser. No. 410,182, filed Oct. 26, 1973 now abandoned.

FIELD OF THE INVENTION

This invention relates generally to pilot valves that are typically utilized to monitor pressure conditions in a pressurized system and to cause the pressurized system to shut or become blocked responsive to detection of operating pressures that are above or below a predetermined acceptable pressure range. More particularly, the invention is directed to the provision of a pilot valve mechanism for use in both high and low pressure sensing or in combination high and low pressure sensing which pilot valve mechanism facilitates high volume flow of control fluid for rapid actuation and deactivation of associated mechanical devices and at the same time effectively prevents displacement or fluid erosion of sealing elements with which the pilot valve mechanism may be provided. The invention also relates but is not limited to pressure actuated pilot valve mechanisms for automatically controlling the flow of pressurized actuating fluid to a pressure actuated device, such as a pneumatic or hydraulic valve actuator, for example, that is utilized for controlling opening and closing movement of a valve that may be remotely located, responsive to sensing of pressure conditions in a flow line that is controlled by the valve.

BACKGROUND OF THE INVENTION

Pilot valve mechanisms, which may also be referred to as control valves, have long been utilized for the purpose of automatically responding to pressure variations in a flow system and inducing actuation or deactivation of mechanical devices in the event a dangerous or undesirable pressure level is sensed. As is typically the case, pilot valves or control valves may comprise a valve body having a pressure responsive valve element disposed therein for controlling communication between the intlet, outlet and vent port of the valve, whereby a mechanical device, such as a valve actuator, may be energized by pressurized pilot fluid passing through the valve and may be deenergized by blocking application of the pressurized pilot fluid and by allowing pilot fluid to be vented from the mechanical device through the pilot valve mechanism.

As is typically the case, a piston within the pilot valve is provided with a plurality of annular grooves having O-rings disposed therein, which O-rings slide across the inlet, outlet and port openings of the valve, depending upon the position of the shuttle valve. When high operating pressures are involved, travel of the O-rings across the ports subject small areas of the O-rings to substantial pressure differentials which causes the O-rings to be eroded quite rapidly by the valve structure at the ports, thus facilitating frequent repair and replacement. Moreover, it has been determined that excessively large ports create extremely rapid wear of the O-rings, while ports that are sufficiently small to prevent excessive O-ring wear typically retard the flow of pressurized medium through the pilot valve mechanism and thus prevent rapid actuation of the mechanical device that is being controlled. Depending upon the particular pressure range at which the pilot valve mechanisms are to function, certain optimum port sizes have been developed that allow sufficient flow for actuation at acceptable speeds even though the speeds are not necessarily optimum. Accordingly, it is desirable at times to provide pilot valve mechanisms for actuator systems having the capability of allowing rapid flow of pilot fluid for rapid actuation without the attendant difficulties that are often associated with the use of sliding O-rings of conventional pilot valve mechanisms.

Another problem typically associated with conventional pilot valve mechanisms is the tendency of O-rings to become completely displaced from their grooves as the result of excessive pressure differential or the tendency of such O-rings to become extruding from the groove to such extent that they become cut or excessively abraded as the O-ring slides passed various structural components of the pilot valve mechanism. It is therefore appropriated to provide a pilot valve mechanism having a facility for positively retaining O-rings in their proper position and for preventing such O-rings from becoming extruded from their grooves.

Where conventional O-rings are employed as dynamic sealing elements and are disposed in sliding engagement with a cylindrical wall defining a bore, such as is typically the case in most commercially available pilot valve mechanisms, the O-ring, after remaining stationary for a suitable period of time, will become adhered to the wall structure defining the bore to such extent that substantial pressure is necessary to break it loose and accomplish the desired actuation. Depending upon the characteristics under which the O-rings operate, it may require pressure in the order of 300 psi to break certain O-rings loose from the wall structure of the bore and to achieve linear actuation of the piston carrying the O-rings. Of course, when the O-ring breaks loose and movement occurs, the piston typically slams to the opposite position because of the pressure differential that is necessary to initiate piston operation. This usually results in erratic and undesirable operation of the pilot valve mechanism causing consequent erractic operation of the mechanical device with which the pilot valve is associated.

Sticking of O-rings is due largely to the fact that surface areas of piston bores have a certain degree of surface imperfection, depending upon the characteristics of the machining operation producing the bore. The material from which most O-rings are composed has a facility for extrusion into the surface imperfections and may have a characteristic of establishing a permanent or semi-permanent set after a certain period of time, thereby causing the O-ring to become mechanically adhered to the wall structure of the bore. It is desirable, therefore, to provide a sealing element having a material in sealing engagement with the bore, which material will be substantially frictionless, to allow relatively free movement of the piston in the bore and which material will not readily extrude into the surface imperfections of the piston bore and become adhered to such surface imperfections.

It is typical for compression springs to be employed in pilot valve mechanisms for imparting a force to a movable shuttle valve assembly that controls the flow of control fluid through the pilot valve mechanism. This is true primarily because the structure necessary for containing compression springs is much simpler and less expensive than other urging devices, such as tension springs, for example. Where control pressure ranges are fairly wide and exceptional repeatability is not a governing factor, pilot valve mechanisms incorporating compression spring devices for shuttle valve actuation are quite acceptable. They are less desirable when the opposite parameters are controlling.

When the coils or convolutions of typical compression springs overlap, it is obvious that the spring rate of the spring is substantially altered. When this occurs, a pilot valve mechanism will also have altered pressure responsive characteristics which may render the valve completely unacceptable for the service for which it is intended. Alteration of the pressure to which the pilot valve mechanisms will respond, may create an unsafe condition if the altered response pressure of the valve is excessively high or low. If the shuttle travel of the valve mechanism is great enough to create a condition were coil interference of the compression spring can occur, it may be undesirable to place such a valve mechanism in a critical environment.

Another undesirable pilot valve pressure responsive condition results when compression springs of pilot valves bend or buckle of such extent that the spring is allowed to rub against an internal surface of the valve mechanism or against a surface of a spring guide. When this occurs, the frictional rubbing engagement of the spring against another surface will substantially alter the spring rate of the spring and will interfere with normal spring function. The occurrence of spring rubbing will obviously modify the pressure range to which the pilot valve mechanism will respond and will frequently render such pilot valve mechanisms undesirable for use in environments where accurate pressure response is critical. Spring rubbing has the effect of broadening the range of pilot valve pressure response which renders compression spring type pilot valves undesirable if the high and low pressures to which the valve must respond are narrowly spaced. Rubbing of the spring will generally create sufficient frictional interference that pilot valves, so constructed, will not respond accurately to low pressures.

It has been considered desirable in the past to achieve piston movement by means of a bellows, because the bellows allows substantially friction-free movement of the piston and yet positively prevents actuating fluid from bypassing the piston and interfering with positive operation of the pilot valve mechanism. Bellows actuation of the piston of a pilot valve mechanism has not been readily acceptable in the past because substantial piston movement is typically required in order to allow sealing elements carried by the piston to move across the ports of the pilot valve and this large amount of movement causes the bellows to become weakened and to fall within a short period of time. It is appropriate, therefore, to provide means for allowing actuation of the piston of a pilot valve mechanism by means of a bellows and to facilitate long life of the bellows through use of a piston mechanism having limited movement.

Accordingly, it is a primary object of the present invention to provide a novel pilot valve mechanism suitable for both high and low pressure actuation, which pilot valve mechanism employs a piston and sealing arrangement allowing a large amount of flow to occur through the pilot valve mechanism with minimal pressure responsive movement of the piston and valve assembly thereof.

It is another important object of the present invention to provide a novel pilot valve mechanism employing sealing elements that promote effective substantially friction-free sealing, promote ease of valve and piston actuation and which do not tend to adhere to the wall structure of the valve mechanism and interfere with relatively free piston and valve movement.

Among the several objects of the present invention is noted the contemplation of a novel pilot valve mechanism developing a flow passage through the valve upon opening of a shuttle valve mechanism, which flow passage is of a dimension at least as great as the dimension of the inlet, outlet or vent ports of the valve mechanism in order to facilitate maximum fluid flow for rapid shut-in of the mechanical device with which the pilot valve mechanism is associated.

It is an even further object of the present invention to provide a novel pilot valve mechanism employing and urging means to oppose movement of the piston and valve mechanism of the pilot valve assembly and which cooperates with the piston and pilot valve mechanism to facilitate effective and accurate operation in narrow ranges of pressure differential operation of the valve mechanism and to achieve accurate high and low pressure operational repeatability.

It is also an important object of the present invention to provide a novel pilot valve mechanism incorporating a tension spring mechanism for imparting a pressure controlling force to a shuttle valve mechanism, which tension spring mechanism is not affected by friction interference and coil override and is accurately responsive a full range of fluid pressures.

It is also an important object of the present invention to provide a pilot valve mechanism that is of simple construction, is reliable in use and low in cost.

Other and further objects, advantages and features of the present invention will become apparent to one skilled in the art upon full consideration of the matter disclosed herein. The form of the invention, which will now be described in detail, illustrates the general principles of the invention, but it is to be understood that this detailed description is not to be taken as limiting the scope of the present invention.

SUMMARY OF THE INVENTION

A preferred embodiment of the present invention may comprise a pilot valve body within which may be defined an elongated passage, which passage is disposed in fluid communication with the fluid pressure of a pressurized system. A piston element may be disposed within the elongated passage and may include annular sealing means disposed in engagement with the wall of a bore defining a part of the passage, whereby the piston element may be movable responsive to pressure variations within the pressurized system. A tension spring, that is adjustable for determination of the pressure at which the particular valve may operate, may act through an actuator stem on a shuttle valve interposed between the actuator stem and piston to oppose movement of the piston and allow piston movement and, consequently, valve movement to be proportional to the pressure variations occurring in the pressurizied system.

The pilot valve mechanism may employ a shuttle valve having end seals, disposed at opposite extremities of a central body portion, which seals may be retained by tapered retainer elements that serve to urge the sealing elements toward the central body portion of the shuttle valve. The end seals are disposed for sealing contact with annular sealing surfaces defined within the valve body. The dimension of the annular sealing surfaces and the chamber within which the valve element is movable, is such that, upon slight movement of the seal elements away from the annular sealing surfaces, fluid flow area will be developed that is at least as great as the dimension of the individual ports, thereby allowing maximum fluid flow through the pilot valve mechanism and ensuring rapid actuation of the mechanical device with which the pilot valve mechanism is associated.

The spring that retards pressure responsive movement of the piston and shuttle valves may conveniently take the form of a tension spring, rather than a compression spring as is typically employed, which tension spring cooperates with the shuttle valve and piston assemblies to ensure precise responsiveness and repeatability of the pilot valve mechanism and ensures efficient operation under circumstances where the mechanical device, with which the pilot valve mechanisms are associated, may function efficiently and accurately even though relatively narrow ranges of pressure differential are involved.

Relatively friction-free sealing elements, carried by the piston of the valve mechanism and disposed in sliding contact with a bore within which the piston is disposed, may incorporate an annular sealing band disposed within an annular groove formed in the piston and having the outer periphery thereof disposed in sealing engagement with the bore. The annular band may have inwardly extending flanges at each extremity thereof serving to retain an O-ring element, that is also disposed within the annular groove, to prevent the O-ring element from being displaced from the annular groove by fluid pressure. The O-ring element also serves to urge the annular band element radially outwardly, thereby maintaining sealing contact between the annular band and the cylindrical wall of the bore.

BRIEF DESCRIPTION OF THE DRAWINGS

So that the manner in which the above recited features, advantages and objects of the present invention, as well as others, which will become apparent, are attained and can be understood in detail, more particular description of the invention, briefly summarized above, may be had by reference to the embodiments thereof which are illustrated in the appended drawings, which drawings form a part of this specification.

It is to be noted, however, that the appended drawings illustrate only typical embodiments of the invention and are threfore not to be considered limiting of its scope, for the invention may admit to other equally effective embodiments.

In the Drawings:

FIG. 1 is an elevational view of a pair of pilot valve mechanisms connected to a support and pressure communicating manifold block; the pilot valve mechanisms having portions thereof broken away and shown in section.

FIG. 2 is a sectional view of a pilot valve mechanism constructed in accordance with the present invention.

FIG. 3 is a fragmentary sectional view of the pilot valve mechanism of FIG. 2, illustrating the piston and seal elements in greater detail.

FIG. 4 is a fragmentary sectional view of a modified embodiment of the present invention showing an enlarged piston and seal arrangement facilitating operation at a different pressure range as compared to the piston and seal structure set forth in FIG. 2.

FIG. 5 is a fragmentary sectional view of the pilot valve structure of FIG. 2, illustrating the sliding piston seal arrangement in detail.

FIG. 6 is an elevational view illustrating the construction of the shuttle valve of the pilot valve assembly of FIG. 2.

FIG. 7 is a fragmentary sectional view of a pilot valve representing a modified embodiment of the present invention and illustrating bellows actuation of the shuttle valve mechanism.

FIG. 8 is a sectional view of a pilot valve mechanism incorporating the teachings of the present invention and representing a modified embodiment hereof.

FIG. 9 is a fragmentary sectional view of a portion of the pilot valve mechanism of FIG. 9 illustrating the shuttle valve mechanism thereof in greater detail.

FIG. 10 is a partial sectional view of a pilot valve mechanism having a shuttle valve mechanism that is generally identical with the shuttle valve mechanism illustrated in FIG. 8 and modified to incorporate a bellows mechanism for pressure responsive control thereof.

FIG. 11 is a sectional view of a pilot valve mechanism representing a further modified embodiment of the present invention.

Figure 11:
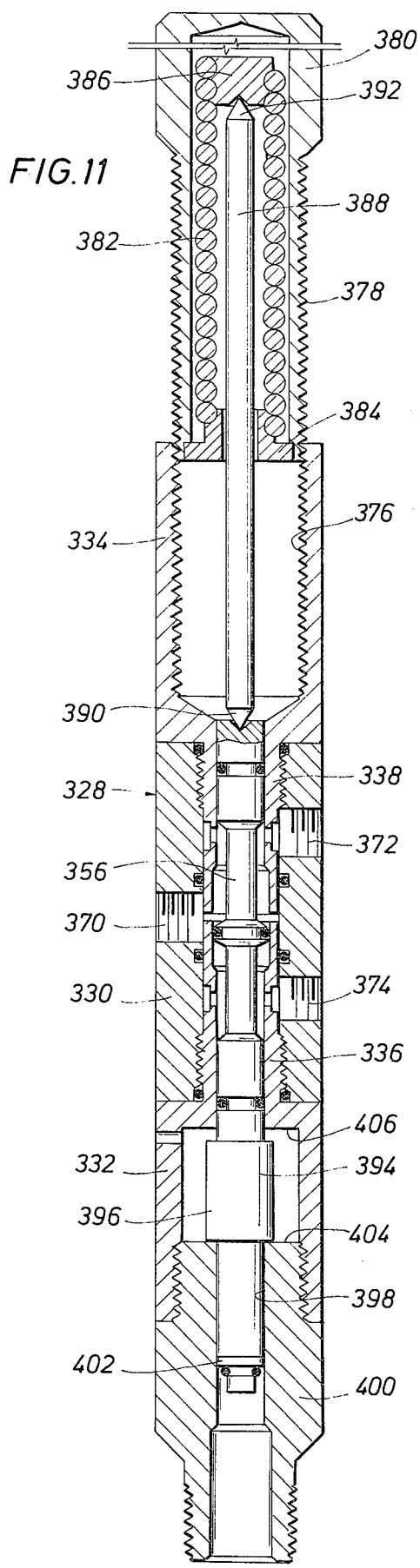
Figure 12:
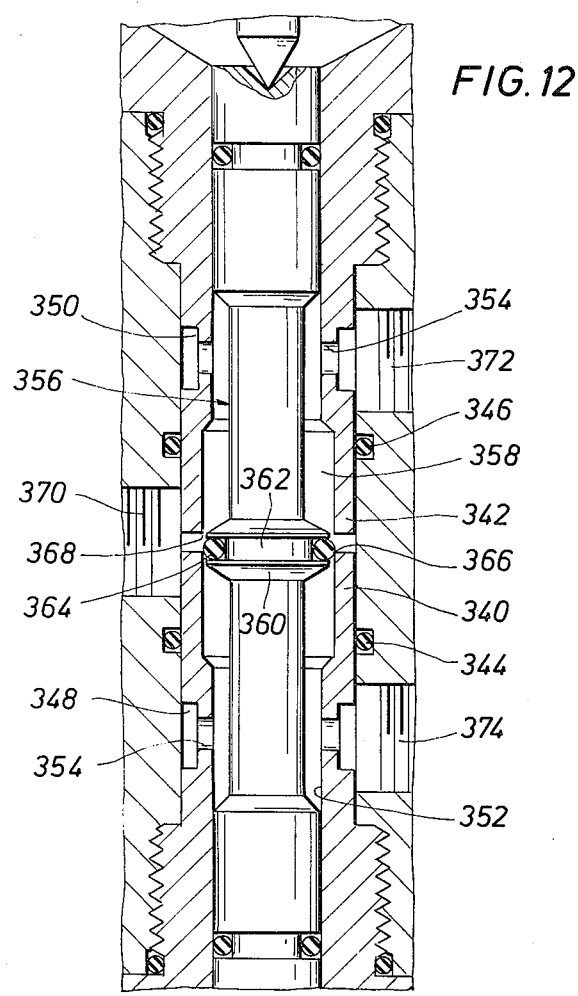

FIG. 12 is a fragmentary sectional view of the pilot valve mechanism of FIG. 11, illustrating the shuttle valve mechanism thereof in greater detail.

Figure 13:
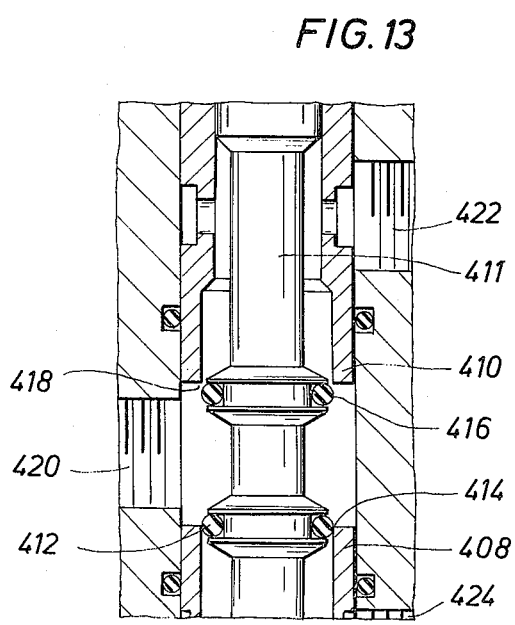

FIG. 13 is a fragmentary sectional view of a pilot valve mechanism representing a further modified embodiment of the present invention, incorporating a shuttle valve mechanism essentially as illustrated in FIG. 11, but incorporating a pair of spaced annular sealing elements instead of the single annular sealing element illustrated in FIG. 11.

DESCRIPTION OF PREFERRED EMBODIMENT

Figure 1:
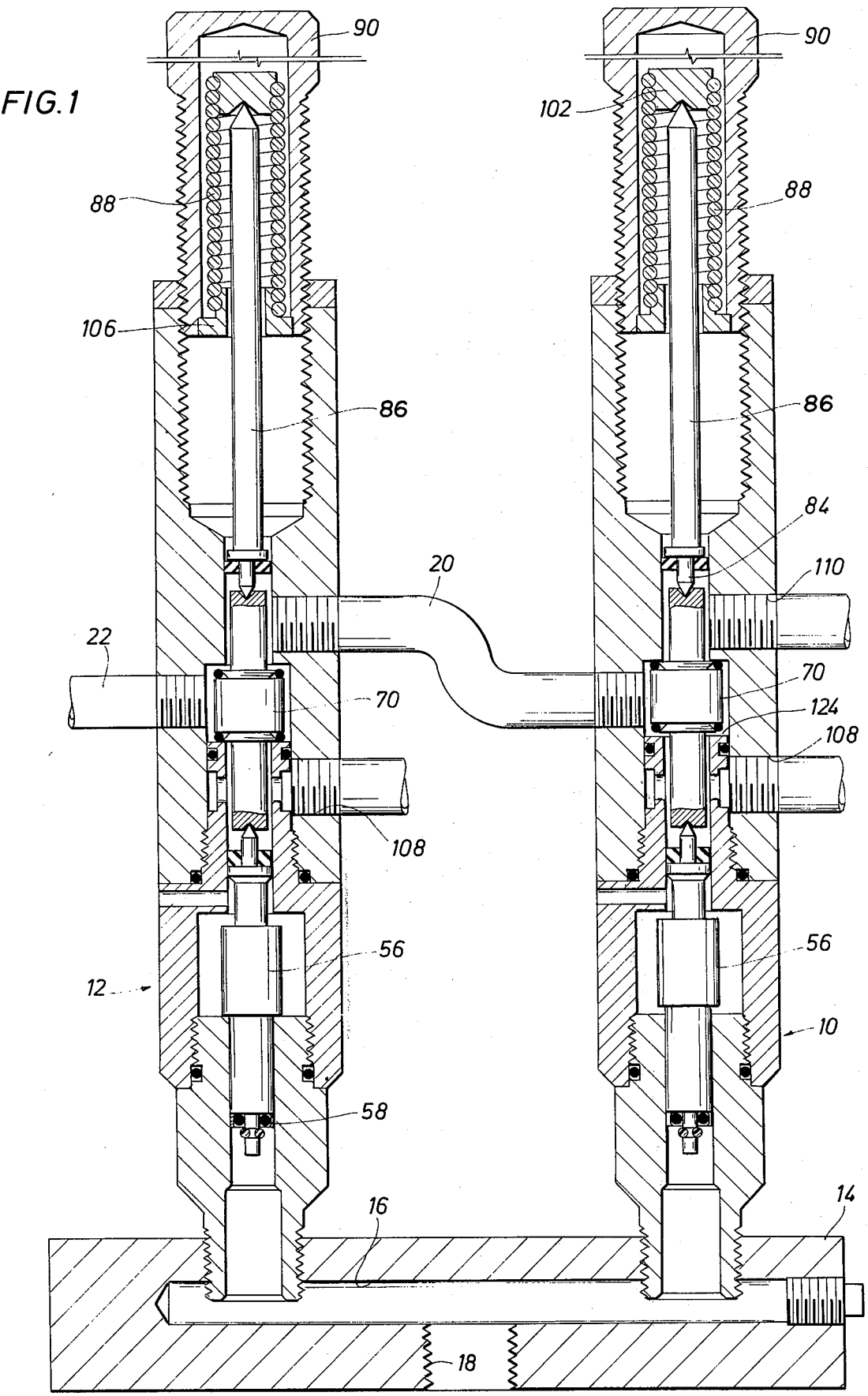

Referring now to the drawings and particularly to FIG. 1, there is disclosed a high-low pilot valve assembly incorporating a pair of pilot valves, one being responsive to excessively high pressure for shutting in operation of a mechanical device, such as a pneumatically actuated valve, and the other being responsive to pressures below a predetermined acceptable pressure range for achieving shut-in of the same mechanical device. While the pilot valve mechanism and high-low pilot valve combination assembly disclosed herein is capable of controlling operation of any number of different mechanical devices, responsive to sensing of fluid pressures, for purposes of simplicity the pilot valve will be discussed in its particular application for control of pneumatically or hydraulically energized valve and valve actuator assemblies. It is not in any manner intended to limit the present invention solely to use in connection with operation of valve and valve actuator assemblies.

As illustrated in FIG. 1, a pilot valve assembly may comprise a low pressure responsive pilot valve mechanism, illustrated generally at 10, and a high pressure sensitive pilot valve mechanism, illustrated generally at 12, both of which are substantially identical in construction and are threadedly connected to a pressure conducting manifold and support block 14 having a passage 16 formed therein and being in communication with a port 18 through which pressurized fluid is connected from a pressurized system for which operational control is desired.

For example, a pressure conducting conduit may communicate pressurized fluid from a flow line that is controlled by a valve and valve actuator assembly to the chamber defined by the bore 16 within the manifold and support block 14. This pressure will be communicated into the high and low pressure pilot valves 10 and 12 and the pilot valves, depending upon whether the pressure sensed is within the limits defined by the high and low pressure pilot valves, will allow communication of a pilot supply pressure source with the valve actuator, thereby maintaining the actuator in an operative condition.

In the event the pressure should rise above in acceptable level or fall below an acceptable level, one of the pilot valve mechanisms will interrupt flow from the pilot supply source to the actuator and will communicate the actuator with a vent, thereby allowing venting of the actuator pressure and causing automatic movement of the actuator to a position closing the valve with which it is associated. As shown in FIG. 1, the pressure being sensed is within the predetermined acceptable pressure range and therefore fluid is communicated from a pilot supply source through the low pressure pilot valve 10, through a connecting conduit 20 and through the high pressure pilot valve mechanism 12 to a pilot pressure supply conduit 22 that is in communication with the valve actuator.

Figure 2:
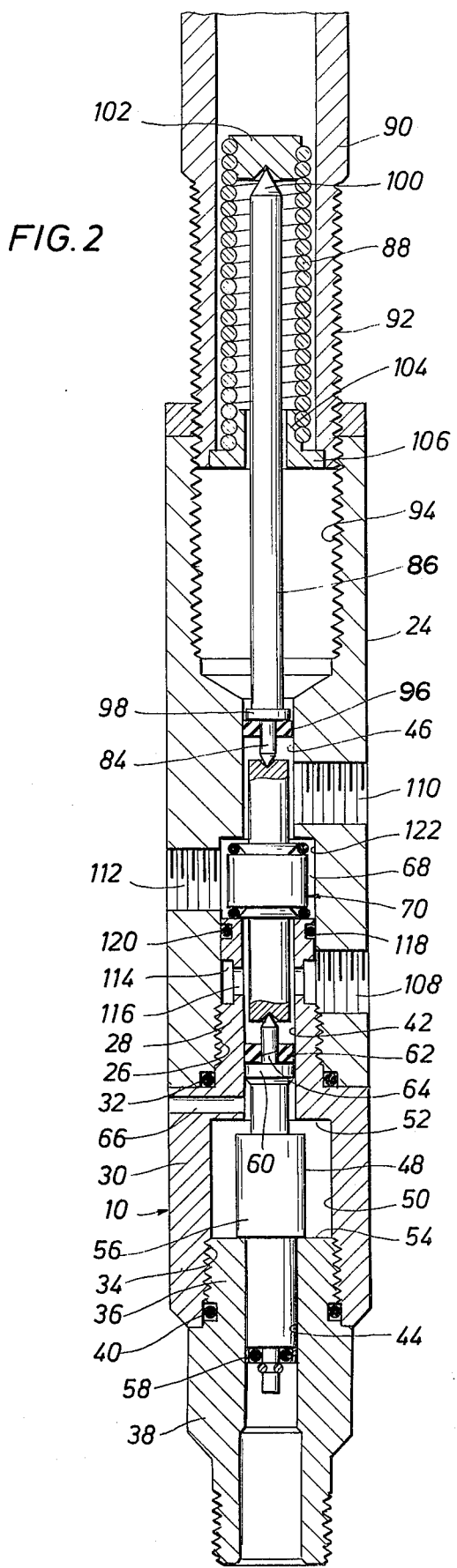

The high and low pressure pilot valve mechanisms, as shown in FIG. 2, are disposed in a "non-venting" position and the valve actuator, being controlled thereby, is therefore disposed in its operative position.

Referring now to FIG. 2, the pilot valve mechanism of the present invention may include a body portion 24 having an internally threaded extremity 26 that receives the externally threaded portion 28 of an intermediate connector element 30. The intermediate connector element is sealed with respect to body portion 24 by means of an annular sealing element 32 that may conveniently take the form of an O-ring received within an annular groove formed in the connector portion 30. The connector portion 30 may likewise have internal threads 34 formed at the lower extremity for receiving the externally threaded portion 36 of a lower connector element 38. An annular sealing element 40, such as an O-ring or the like, may establish sealed relationship between the lower connector element 38 and the intermediate connector 30.

The intermediate connector element 30 may have an axial bore 42 formed therein that is disposed in co-axial relationship with an axial bore 44 defined within the lower connector element 38 and with an axial bore 46 defined in the body portion 24. A piston element 48 may be disposed within an elongated passageway defined collectively by the bores 42 and 44 and by an enlarged bore 50 defined within the intermediate connector element 30. The piston element may be disposed for axial reciprocation within limits defined by annular shoulders 52 and 54 defined respectively on the intermediate and lower elements 30 and 38. An annular enlarged portion 56 of the piston element will engage the surfaces 52 and 54 to limit movement of the piston element in either axial direction thereof.

At the lower extremity of the piston element, as illustrated in FIG. 2, an annular seal assembly is disposed about the piston element and establishes sealed engagement with the bore 44 thus preventing pressure sensed by the pilot valve from entering the valve chamber of the valve. The seal assembly 58 is of frictionless or low friction characteristics and is described in detail hereinbelow in connection with FIG. 5. At the upper extremity of the piston element, as shown in FIG. 2, there is provided an annular seal carrier element 60 that also serves to guide the piston within the bore 42 and thereby maintains accurate alignment of the piston within the valve mechanism. A wiper seal 62, carried about an axially projecting shuttle support pin 64 and disposed in abutment with the annular seal support and piston guide element 60, is also disposed in sealed engagement with the piston bore 42, serving to prevent any pressure that might leak past the seal assembly 58 from entering the valve chamber of the pilot valve assembly. A vent passage 66 may be formed in the intermediate connector portion 30 and may serve to vent any pressurized medium leaking past the sealing element 58 and thereby provide an external indication that repair of the valve assembly is necessary.

Figure 3:
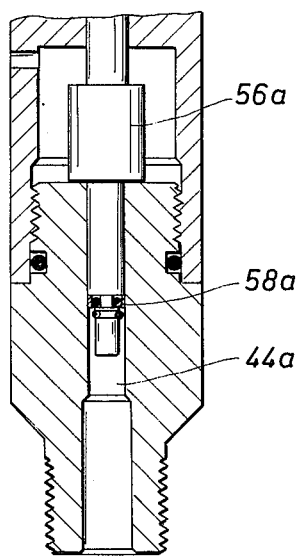
Figure 4:
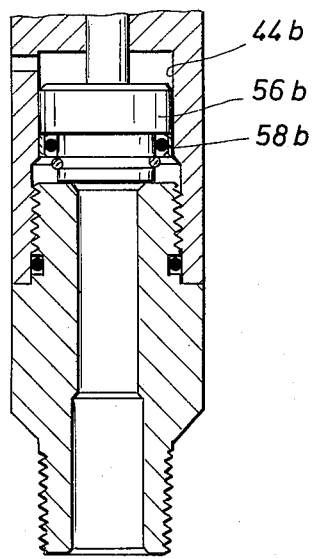

The design of the lower extremity of the piston structure may be varied within the scope of the present invention, depending upon the particular pressure range that is to be sensed by the pilot valve assembly. Where variations in high fluid pressures are to be detected, the piston structure may conveniently take the form illustrated in FIG. 3, where the piston 56a and the piston seal assembly 58a arrangement are of relatively small diameter, presenting a relatively small piston surface area equivalent to the circular area defined by the bore 44a that is acted upon by the pressurized medium being detected. Conversely, where variations in low pressure are concerned, the piston 56b and the piston seal assembly 58b may be constructed in accordance with FIG. 4 wherein the piston and seal arrangement presents a large piston area equivalent to the circular area defined by the piston bore 44b against which the pressurized medium is applied for actuation of the shuttle valve of the pilot valve mechanism against the force developed by the tension spring.

Axial bores 42 and 46 communicate with an annular bore or chamber 68, which, together with the axial bores, may constitute a valve chamber. A shuttle valve assembly, illustrated generally at 70 and shown in detail in FIG. 6, may be movably disposed within the valve chamber and, upon being moved, responsive to variations in pressure differential sensed by the pilot valve mechanism, may control the flow of actuating pressure, also referred to as pilot pressure, to a remotely located device for actuation thereof.

Shuttle valve support extensions 72 and 74 may be provided on the shuttle valve 70 and may have valve centering depressions 76 and 78 defined, respectively, therein, which depressions may receive the pointed support portions 80 and 82, respectively, of shuttle valve support elements 64 and 84. Shuttle valve support element 84 may be defined axially of a valve and piston urging stem 86 that may be urged downwardly by a tension spring 88 carried by a spring adjustment element 90. The tension spring 88, always being in tension, will not have any tendency to buckle or bend and therefore, it will not be susceptable to rubbing friction contact with the internal surfaces of the valve mechanism nor will it have any tendency to establish rubbing contact with the stem 86. The spring rate of the compression spring will always remain stable and, therefore, the pressure response range of the pilot valve mechanism will not vary from its precise setting because of spring interference. Moreover, maintenance of the spring 88 in tension will effectively eliminate the problem of spring override and therefore, will prevent the convolutions of the spring from interfering with one another and otherwise altering the spring rate of the spring.

The spring adjustment element may be provided with an externally threaded portion 92 diposed in threaded engagement with an internally threaded bore 94 defined in the upper extremity of the valve body 24. An annular sealing element 96, that may be disposed about the shuttle valve support pin 84, may be abutted against an annular support flange 98 defined on the stem 86 and may establish sealed engagement with the bore 46, thereby preventing fluid from leaking into the upper portion of the valve mechanism.

At the upper extremity of the stem 86 may be provided a frusto-conical portion 100 that may be received within a conical depression formed in a spring retainer element 102 that is in turn secured within the upper extremity of the tension spring 88. The lower extremity of the tension spring may be secured to a spring retainer 104 having a lower annular flange 106 received within a corresponding recess in the lower portion of the adjustment element 90, thereby serving to positively restrain movement of the lower portion of the tension spring.

A plurality of flow passages 108, 110 and 112 maybe disposed in communication with the valve chamber 68 and, depending upon utilization of the valve mechanism for high pressure or low pressure responsive control or depending upon utilization of pilot valves in high-low pressure sensing combination, the ports may have different functions. For example, assuming the pilot valve mechanism to be utilized as the high pressure pilot valve of a high-low pressure pilot valve combination assembly, such as set forth in FIG. 1, port 110 will represent an inlet port through which pilot fluid may flow from the low pressure pilot valve mechanism into the valve chamber 68. Port 112 will represent an outlet port through which fluid may flow from the valve chamber 68 to control the valve and actuator mechanism with which the pilot valve assembly may be associated. Port 108, under this circumstance, will represent a vent port through which fluid may be vented from the valve and actuator mechanism through the port 112 in the vent of high pressure shut-in.

Figure 6:
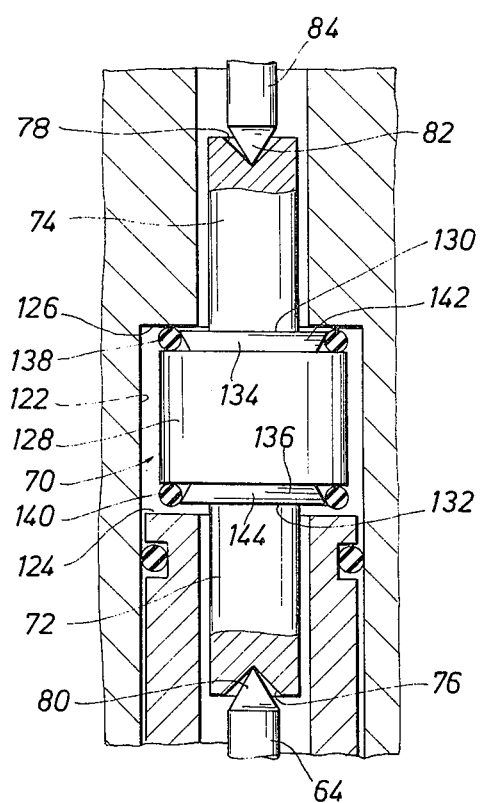

The intermediate connector element 30 may be provided with an axially extending portion 28, the lower portion of which may be externally threaded for threaded connection to the internally threaded portion 26 of the valve body 24. The upper extremity of the axially extending portion 28 may be cut away to define an external annular groove 114 cooperating with the wall structure of the valve body portion 24 to define an annular chamber disposed in communication with the port 108. Fluid communication, between the annular chamber defined by the groove 114 and the valve chamber within which the shuttle valve is movably disposed, may be defined by one or more ports 116 formed through the wall structure of the axially extending portion 28. An annular groove 118 may be formed in the axially extending portion 28 adjacent the upper extremity thereof, within which groove may be disposed an annular sealing element 120 such as an O-ring or the like, for establishing sealing engagement between the axially extending portion 28 and the generally cylindrical wall 122 defining the valve chamber 68. The upper extremity of the axially extending portion 28 of the intermediate connector element 30 may provide an annular seal surface 124, as illustrated in FIG. 6, that is disposed for abutment with the shuttle valve element 70. An annular abutment shoulder 126 may also be defined within the valve body 24 and may be disposed for sealed abutment with the opposite sealing portion of the shuttle valve assembly.

Referring now specifically to FIG. 6, the shuttle valve assembly may include an enlarged central portion 128 having opposed fructo-conical seal retainer elements 130 and 132 formed at opposite extremities thereof. Frusto-conical cam surfaces 134 and 136 may be defined by the seal retainer elements and may serve to urge annular sealing elements 138 and 140 toward annular seal abutment surfaces 142 and 144 defined by the annular enlarged portion 128 of the shuttle valve. The tapered cam surfaces 134 and 136 prevent the annular sealing elements 138 and 140 from becoming displaced from the shuttle valve element in the event excessive pressure or flow conditions are encountered.

The shuttle valve assembly may achieve a sealing function by moving appropriate ones of the annular sealing elements 138 and 140 into sealed abutment with respective annular sealing surfaces 126 and 124. The valve construction is such that a slight movement of the O-ring sealing elements, away from the respective annular sealing surface, will facilitate development of a flow passage of a dimension at least as great as the dimension of the valve ports. This feature allows rapid development of sufficient flow passage dimension to allow maximum flow of pilot fluid from the valve and actuator mechanism during venting, thereby facilitating extremely rapid shut-in, responsive to sensing of undesirable pressure conditions. During tests, it has been determined that valve movement of as little as .020 inches is effective to achieve a flow passage dimension as great as the dimension of the inlet, outlet or vent ports.

In pilot valve mechanisms it is highly desirable to provide a mechanical apparatus that is responsive to sensation of pressure variations to provide a flow of pressurized control fluid or to allow control fluid to be bled from an actuator mechanism. It is also desirable that the pilot valve mechanism have exceptional repeatability, i.e., repeated actuation at precise pressure levels and that it be capable of functioning within relatively narrow ranges of pressures.

It is common to employ O-rings in pilot valve mechanisms for control of fluid flow therethrough and for separation of areas of unbalanced pressure. O-rings that slide against cylindrical surfaces to achieve sealing between movable elements are quite effective in operation, but tend to detract from desired features of repeatability and narrow pressure range operation of pilot valve assemblies, because of the substantial level of friction that is often developed between the O-rings and the respective sealing surfaces. It is also well known that O-rings tend to be displaced or squeezed from the annular grooves thereof as pressure applied to the O-rings is increased, which displacement causes the O-rings to enlarge and substantially increase in frictional sealing contact with the cylindrical surfaces against which the O-rings slide. This feature causes frictional interference to vary as pressure varies and therefore causes pressure responsive pilot valve operation to be erratic in nature.

The erratic nature of O-ring utilization is further evident because O-rings, when allowed to remain stationary for long periods of time, tend to stick to the sealing surfaces. Considerable pressure differential is typically necessary to break the O-rings loose from the sealing surfaces and such pressure differential obviously detracts from accurate operation of the pilot valve mechanism.

Figure 5:
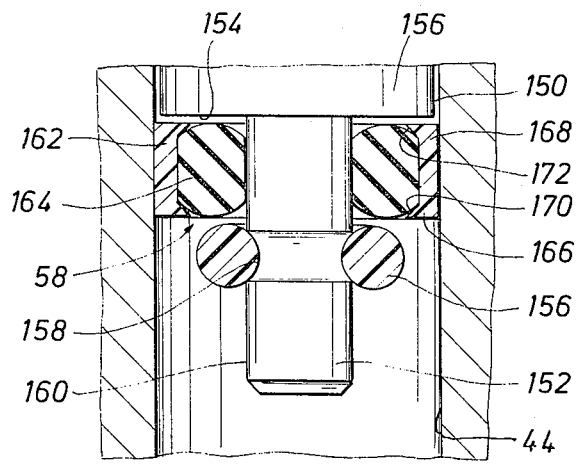

According to the present invention, one suitable construction for providing a sealing mechanism that has low friction capability to promote repeatability in operation, which promotes narrow pressure range operation of pilot valve mechanisms and which also will not stick when allowed to remain stationary for long periods of time may conveniently take the form illustrated in FIG. 5. The piston element 56 may be provided with a reduced diameter portion 150 that is received in close fitting, but non-touching relation within the bore 44. The reduced diameter portion 150 may be provided with a further reduced diameter axially extending portion 152 that receives a seal assembly that may be referred to as a "slipper seal assembly" and incorporates an inner soft elastomeric sealing element that serves both as a sealing element and as an urging means for a stable friction resistant element disposed thereabout.

The soft elastomeric sealing element 164 may be disposed about the generally cylindrical sealing surface 160 in sealing engagement therewith and may be received in encircled relation within a relatively thin annular sealing band 162 having exceptional sealing ability and low friction characteristics and which does not have an affinity for sticking to the cylindrical sealing established by the bore 44.

The slipper seal assembly may be retained in assembly with the axially extending portion 152 of the stem 56 by an annular retainer element 156 that is received within an annular groove 158 formed in the axial extension 152 and which retainer element may conveniently take the form of an O-ring composed of any suitable elastomeric material. It should be borne in mind that the slipper seal assembly will be subjected to pressure from one direction only and therefore, it is not necessary that the retainer element 156 be capable of retaining the slipper seal when the seal is subjected to fluid pressure. The retainer element serves to retain the slipper seal in position on the axial extension 152 during assembly of the valve mechanism and also retains the slipper seal in position on the extension during periods when the valve mechanism is not subjected to pressure.

Referring now to FIG. 5, the piston 56 may include a reduced diameter portion 150 having a further reduced diameter portion 152 cooperating therewith to define an annular shoulder 154. A retainer ring groove 158 may be formed in the pin 152 and may receive a retainer ring 156 that serves to retain a seal assembly, referred to as a slipper seal assembly, in operative relation to the reduced diameter portion 152 of the piston.

The slipper seal assembly may comprise an annular sealing band 162 composed of a friction resistant material such as polytetrafluoroethylene, for example, which will establish sealing engagement within the bore 44, but will not be susceptible to sticking. Moreover, the slipper seal assembly may include a soft annular elastomeric sealing element having the capabiltiy of yielding to fluid pressure and enhancing the sealing ability of the sealing band. As depicted in detail in FIG. 5, an elastomeric annular sealing element 164, which also functions as an urging means, is received in close fitting relation about the reduced diameter portion 152 of the piston and is interposed between the reduced diameter portion of the piston and the annular seaing band, serving to impart radial forces to the thin sealing band that urges the peripheral portion of the sealing band into sealing engagement with the internal surface defined by bore 44.

One difficulty, attendant with the use of O-rings for the purpose of sealing under high pressure conditions, is the fact that the O-rings may tend to extrude outwardly of the O-ring recess where it may become damaged or subjected to extensive wear as it slides within the bore with which sealing contact is to be maintained. To prevent extrusion of the O-ring 164 from the groove 160, the annular sealing band 162 may be provided with a pair of annular inwardly extending flanges 166 and 168 having inwardly tapered generally frusto-conical surfaces 170 and 172 defined respectively thereon. The frusto-conical surfaces 170 and 172 provide a camming function tending to urge the annular sealing element 164 toward a centralized position between the flanges 166 and 168. Should the sealing elements 164 be moved in either lateral direction, responsive to application of pressure, the annular retainer flanges 166 and 168 will effectively prevent the O-ring element from being extruded from the groove where it might be damaged or become excessively worn. Moreover, as soon as the pressure being sensed by the O-ring and sealing band structure has dissipated to an acceptable level, the O-ring will tend to be returned toward a centralized position between the cam surfaces 170 and 172 by the camming action of respective ones of the cam surfaces.

To establish a relatively friction-free sliding relationship between the annular sealing band 162 and the wall structure 44 of the bore, the sealing band may be composed of a material having low friction characteristics and which will not tend to become adhered to the wall structure of the bore 44. It has been determined that a sealing band composed of polytetrafluoroethylene, or any other similar acceptable plastic material, may be utilized quite efficiently. The annular sealing element 164 may be composed of any one of a number of suitable elastomeric materials, depending upon the characteristics of the fluid with which it may come into contact.

Figure 7:
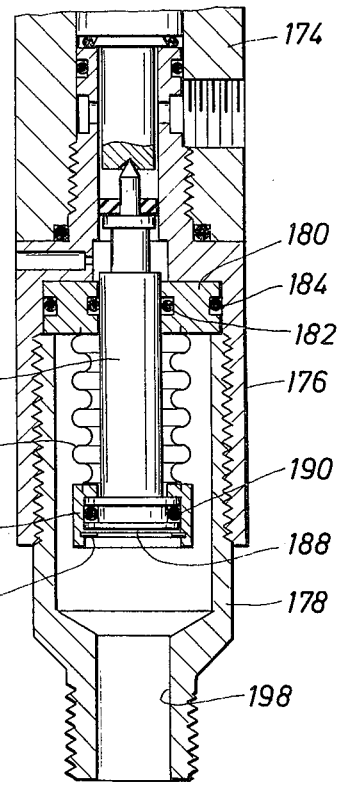

Attention is now directed to FIG. 7, which is a fragmentary sectional view of a pilot valve mechanism representing a modified embodiment of the present invention. The pilot valve shown in FIG. 7 may incorporate a valve body 174 constructed essentially as shown in FIG. 2 at 24. A connector element 176 may be threadedly connected to the body portion 174 and may threadedly receive a connector element 178 that cooperates with the intermediate connector 176 to retain an annular seal and piston guide element 180 in fixed relationship with the pilot valve structure. Internal and external sealing elements 182 and 184, respectively, establish sealing relationship with a movable piston element 186 and with the internal wall structure of the intermediate connector 176.

The piston element 186 may be provided with an enlarged annularly grooved portion 188 having an annular sealing element 190 carried thereby and establishing sealed relationship with a bellows cap 192 retained in assembly with the annular portion 188 of the piston by a retainer ring 194. A bellows element 196 is secured both to the bellows cap 192 and to the annular seal and piston guide element 180 and maintains a sealed relationship while allowing the piston element 186 to reciprocate responsive to variations in the pressure communicated through port 198 of the connector element 178. It is considered desirable to fill the space between the bellows 196 and the piston 186 with an incompressible medium, such as water, to prevent the bellows from being collapsed by fluid pressure applied thereto. Although the fluid disposed within the bellows is incompressible, the material from which the bellows is composed will flex to a certain degree allowing slight movement of the piston. As indicated above, it is only necessary that the piston element be allowed slight axial movement since such slight movement will accomplish full opening of the shuttle valve element.

Figure 8:
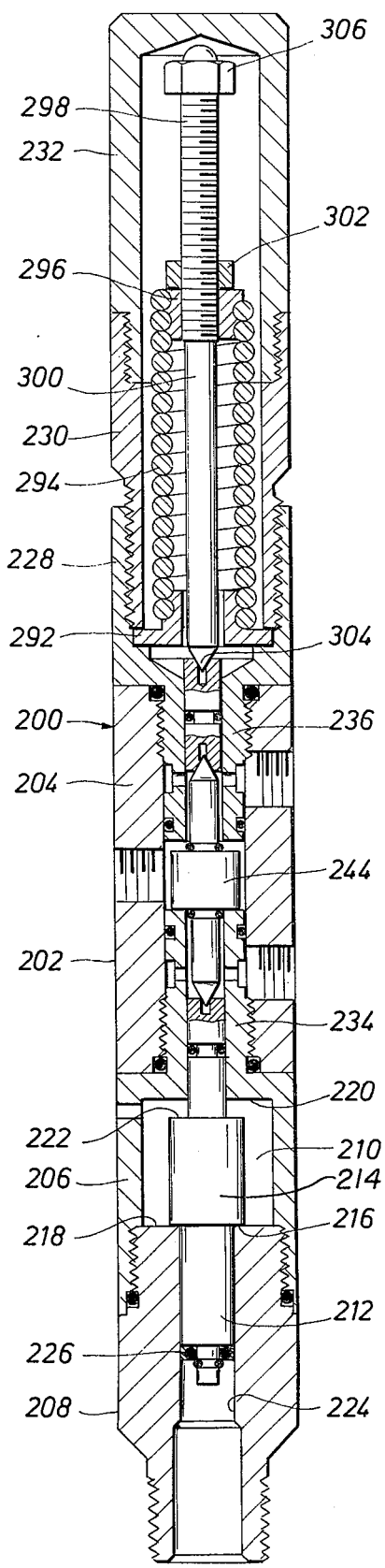
Figure 9:
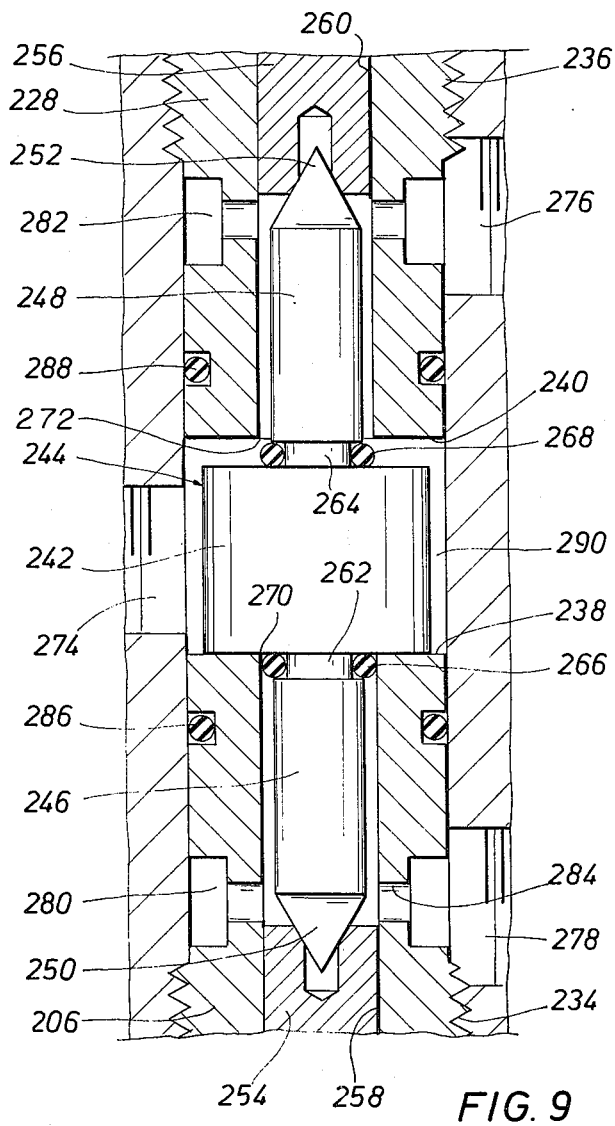

Referring now to FIG. 8, there is depicted a modified embodiment of the valve mechanism of this invention, the modification relating specifically to the shuttle valve mechanism illustrated in greater detail in FIG. 9. The pilot valve mechanism illustrated generally at 200 in FIG. 8 may incorporate a body portion 202 having an intermediate section 204 that threadedly receives intermediate and outer body sections 206 and 208. The body sections 206 and 208 cooperate to define a chamber 210 within which is received a piston element 212 having an enlarged portion 214 defining a stop shoulder 216 that engages a stop surface 218 formed on the body portion 208 to limit axial movement of the piston element 212 in one direction thereof. Movement of the piston element is limited in the opposite direction by a stop surface 220 defined by the body section 208 which is engaged by a stop shoulder 222 formed on the enlarged portion 214 of the piston element. The chamber 210 is defined in part by a bore 224, within which a pressure responsive portion of the piston element is disposed. A slipper seal assembly 226 constructed essentially as illustrated in FIG. 5 may be carried by the piston element 212 and may be disposed in sliding sealed engagement with the cylindrical surface defined by the bore 224.

The valve body 202 of the pilot valve 200 may include an adjustment section 228 that may be threadedly connected to the intermediate portion 204 and may, in turn, threadedly receive a spring housing section 230 including a spring housing cover 232.

Each of the body sections 206 and 228 may be provided with reduced diameter axially extending portion 234 and 236, respectively, that may be attached to the intermediate body section 204 by means of threaded connection and the axially extending portions define opposed stop shoulders 238 and 240 that are disposed in spaced relation, as shown in detail in FIG. 9. The stop shoulders 238 and 240 are disposed for stopping abutment with an enlarged central portion 242 of a valve shuttle element illustrated generally at 244. The shuttle valve element 244 may include opposed axially extending portions 246 and 248, each having conical support surfaces 250 and 252, respectively, that are received within respective conical support recesses defined in a pair of valve engaging stems 254 and 256. The valve engaging stems are, in turn, received within bores 258 and 260 extending through the housing section 206 and 228, respectively.

Each of the axially extending portions 246 and 248 of the shuttle valve element 244 may be provided with annular seal recesses 262 and 264 that may receive annular sealing elements 266 and 268, respectively, therein. The sealing elements 266 and 268, which, if desired, may conveniently take the form of O-rings composed of any suitable elastomeric material, may be of such external dimension that the same may be received in sealed engagement within the respective bores 258 and 260, and the sealing elements 266 and 268 are so spaced, in relation to the spacing of the annular shoulders 238 and 240 that with one sealing element fully received within one of the bores, the opposite sealing element will be slightly spaced from an opposite sealing lip or edge. For example, the surfaces 238 and 240, intersecting the respective bores 258 and 260 define circular edges 270 and 272. As shown, in FIG. 9, the shuttle valve element 244 is moved fully downward in engagement with the abutment surface 238 and the O-ring 266 is fully received within the bore 258. The opposite O-ring 268 is shown to be slightly spaced from the annular edge 272 defined by the intersecting relationship between surface 240 and the bore 260. Only slight movement of the valve element upward is necessary to cause engagement between the sealing element 268 and the circular edge 272 and such slight movement achieves interruption of the flow path between the outlet port 274 and a high pressure port 276. Under this condition, the O-ring 266 seals the low pressure port 278 with respect to the outlet port 274.

Because only slight movement of the shuttle valve element 244 is necessary to accomplish interruption of a flow path, the valve mechanism will be rendered quite sensitive and will be efficiently responsive to pressures that are slightly above or below the actuating pressure for which the pilot valve mechanism may be set.

Full movement of the shuttle valve 244 in the opposite direction, or upward as illustrated in FIG. 9, will cause the enlarged portion 242 of the shuttle valve to move into abutment with the surface 240 and will cause the O-ring 268 to be fully received within the bore 260. Under this condition the O-ring 266 will be slightly spaced from the circular sealing edge 270 and will require only slight movement downward to interrupt flow between the ports 274 and 278.

Annular grooves 280 and 282 may be formed, respectively, about the outer peripheral portion of the axial extensions 234 and 236 and may be communicated to the respective bores 258 and 260 by means of a plurality of transverse passages 284. Annular sealing elements 286 and 288, such as O-rings or the like, may be retained within respective annular grooves, formed in the axially extending portions 234 and 236 and may establish a seal between the axially extending portions and the intermediate body section 204 to prevent leakage of control fluid between the shuttle valve chamber 290 and the respective ports.

A spring carrier element 292 may be retained in engagement with the adjustment section 228 of the valve housing by one extremity of the spring housing section 230 that bears thereagainst when received in fully threaded relationship with the adjustment section 228. A tension spring 294 may have one extremity thereof fixed to the spring carrier element 292 while the opposite extremity of the spring may be fixed about an adjustment and retainer nut 296 through which an externally threaded portion 298 of a spring stem 300 extends. A lock nut 302 may also be received by the threaded portion 298 of the stem 300 and may be manipulated for locking engagement with the nut 296 to prevent inadvertent movement of the nut 296 relative to the stem during operation of the valve mechanism. The stem 300 may be provided with a conical inner portion 304 that may be received within an appropriate conical recess formed axially within the valve engaging stem 256, thereby causing the forcing induced by the tension spring 294 to be transmitted through the valve engaging stem 256 to the shuttle valve element 244.

The outer extremity of the stem 300 may be provided with an adjustment nut 306 that is fixed to the stem. A wrench may be applied to the nut 306 to impart rotation to the stem after the lock nut 302 has been appropriately loosened. The pilot valve mechanism may be adjusted simply by removing the spring housing cover 232, loosening the lock nut, accomplishing the appropriate adjustment of the stem 300, tightening the lock nut and replacing the spring housing cover. It is not necessary to shut down the flow line to which the pilot valve mechanism is associated in order to achieve adjustment of the operating pressure of the pilot valve mechanism.

Figure 10:
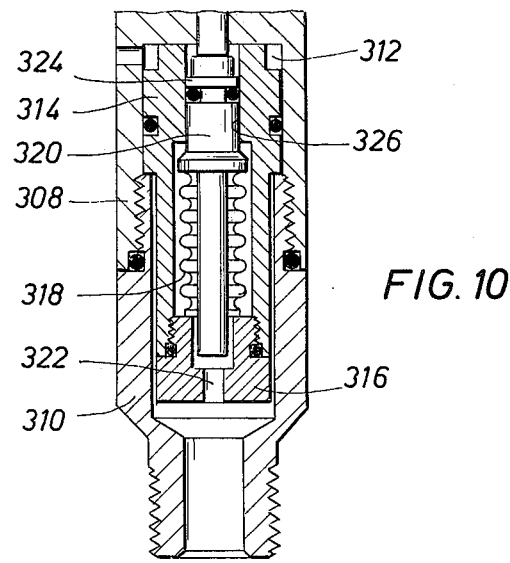

In FIG. 10 there is depicted a pilot valve mechanism having all of the attributes discussed above in connection with FIGS. 8 and 9 and being modified only in the provision of a bellows unit that allows effective hydraulic pressure transmission through the valve mechanism for operation thereof, and prevents line fluid from coming into contact with the inner portions of the pilot valve mechanism. As shown in FIG. 10, housing sections 308 and 310 cooperate to define a bellows chamber 312 within which is received a bellows housing 314 having a bellows connector element 316 threadedly connected thereto. To the bellows connector element 316 may be connected a bellows 318 having a piston 320 secured to one extremity thereof. The annulus about the bellows may be filled with a substantially incompressible medium, such as water, and the pressurized line fluid may be conducted through a passage 322 into the interior of the bellows. Although the medium surrounding the bellows is substantially incompressible, there will be some minute movement of the bellows responsive to pressure changes within the line fluid and such minute movement will be sufficient for pilot valve actuation. The bellows mechanism will function essentially the same as the bellows mechanism illustrated in FIG. 7.

A slipper seal mechanism 324 may be retained in assembly witth the piston 320 and may establish a sealing relationship between the piston and the internal bore 326 of the bellows housing 314.

Referring now to FIG. 11, there is disclosed a pilot valve mechanism illustrated generally at 328 which constitutes a further modified embodiment of the present invention and incorporates an intermediate body section 330 having body sections 332 and 334 connected thereto. Axially extending portions 336 and 338 of the body portions 332 and 334 threadedly engaged the intermediate body section 330 and provide valving extensions 340 and 342 that are disposed in closely spaced opposed relationship as shown in detail in FIG. 12. The valving extensions 340 and 342 are disposed in sealed relationship with the intermediate body section 330 by means of annular sealing elements 344 and 346, respectively, which may conveniently take the form of O-rings, retained within annular O-ring grooves, or, in the alternative, may take any other desirable form as deemed appropriate. The valving extensions 340 and 342 may have annular grooves 348 and 350 defined in the outer peripheral portion thereof which grooves may be disposed in communication with a bore 352 by appropriate transverse passages 354.

A valving element, illustrated generally at 356 in FIG. 12, may be disposed for reciprocal movement within the bore 352 and within an annular chamber 358 defined by the annulus existing immediately about the shuttle valve element 356 and may incorporate an enlarged intermediate portion 360 having an annular groove 362 formed therein, which groove may receive an annular sealing element 364. The sealing element 364 may conveniently take the form of an elastomeric O-ring or any other suitable sealing device without departing from the spirit and scope of the present invention.

It is to be noted that the annular sealing element, when disposed in touching engagement with an annular sealing edge 366 of one of the valving extensions 340 and 342, will be slightly spaced from the annular edge 368 defined by the opposite valving extension. This feature promotes rapid operation of the valve mechanism upon slight axial movement of the shuttle valve element 356, because it is only necessary that the O-ring 364 be moved a few thousandths of an inch in order to be brought into sealing engagement with the sealing edge of the opposite valving extension. Full flow communication between the outlet port 370 and one of the high pressure or low pressure ports 372 and 374, respectively, may be effectively accomplished upon slight movement of the O-ring element, responsive to slight movement of the shuttle valve 356. Further movement of the shuttle valve in either direction will merely cause the O-ring element 364 to be moved within the respective bore defined within the valving extension. Since opening and closing of the shuttle valve mechanism will occur upon slight movement of the shuttle valve, it is obvious that the pilot valve mechanism will be immediately responsive to slight pressure changes above or below the preset pressure level for which actuation of the valve mechanism is desired.

Section 334 of the valve housing may be internally threaded as shown at 376 in order to receive an externally threaded portion 378 of a spring adjustment element 380 that also provides a cover mechanism for a tension spring 382 that is retained in assembly with the adjustment element 380 by a spring retainer 384. A stem abutment element 386 may be fixed to one extremity of the tension spring 382 and may impart the force of the spring to an elongated force transmitting stem 388 having conical extremities 390 and 392 that engage the shuttle valve element 356 and the spring abutment 386 respectively. The tension of the spring 382 may be adjusted simply by rotating the adjustment element 380 relative to the threaded portion 376 of housing section 334, thereby causing the tension of the spring 382 to be increased or decreased as is desired for appropriate setting of the pressure range to which the pilot valve mechanism is responsive.

The shuttle valve element 356 may be disposed in abutment with an enlarged portion 394 of a piston element 396 which piston element has a sealing portion thereof received within a bore 398 defined within a body section 400. A slipper seal mechanism 402, constructed and functioning essentially identical as compared with the slipper seal mechanism illustrated and described in connection with FIG. 5, may be provided at one extremity of the piston 396 in order to establish friction resistant sealing capability with respect to the bore 389. The enlarged portion 394 of the piston element 396 may engage abutment surfaces 404 and 406 to limit axial movement of the piston and the shuttle valve element in either axial direction thereof.

Referring now to FIG. 13, it may be desirable to provide a shuttle valve mechanism having a pair of annular O-rings instead of the single O-ring type shuttle valve element set forth in FIG. 12. It will be desirable to space the valving extensions 408 and 410 to such extent that one of the O-rings 412 will engage an annular edge 414 thereof while the opposite O-ring sealing element 416 will be disposed in slightly spaced relationship with the opposite annular edge 418. Only slight movement of the piston element is necessary to achieve interruption of the flow between the outlet port 420 and either of the high or low pressure ports 422 or 424.

OPERATION

Referring now again to FIG. 1, both the high and low pressure pilot valve mechanisms will be disposed in the nonventing position thereof as long as pressure communicated into the chamber defined by bore 16 is within a normal operating range. If, for some reason, the pressure should fall below the operating range, the tension spring will urge the shuttle valve 70 downwardly, thereby causing the lower sealing element thereof to engage the lower annular seal surface, causing the supply of pilot pressure to be blocked and allowing pilot pressure medium from the valve and actuator assembly to be communicated through the conduit 22, high pressure pilot valve 12 and conduit 20 to the bleed passage 110 where it will be vented to the atmosphere or, in the alternative, will be conducted to a suitable receiver for disposal. As discussed above, only slight axial movement of the piston and shuttle valve element is necessary to achieve full opening of a flow passage area through the pilot valve assembly that is at least as great as the dimension of the bleed and pilot supply passages. The valve actuator will, therefore, vent quite rapidly, allowing rapid shut-in of the valve with which the actuator is associated. The high pressure pilot 12, under these conditions, will remain in the position illustrated in FIG. 1 with the shuttle valve element 70 in its lowermost position.

In the event fluid pressure within the passage 16 should become excessive, such pressure, acting upon the piston assembly 56, will urge the shuttle valve element 70 upwardly, thereby blocking communication between conduits 20 and 22 and opening communication between conduit 22 and the vent port 108. Pressurized medium within the valve actuator, under this circumstance, will be allowed to vent through the bleed port 108 of the high pressure pilot valve mechanism and the valve actuator and valve assembly will again be immediately moved to a predetermined safe condition. It is therefore evident that the pilot valve construction of the present invention may be utilized either as a high or low pressure sensing pilot, depending solely upon the parameters of design. It is also obvious that the pilot valve mechanism of the present invention may be efficiently utilized separately for single pressure function control of a remotely located pilot pressure operated device, such as valve actuator and valve assembly.

The pilot valve mechanism of the present invention has been found through tests to have excellent repeatability even though narrow ranges of pressure variation are involved. Repeatability and accuracy of the pilot valve mechanism is accomplished largely through the use of relatively friction-free piston sealing means and through the use of a tension spring for development of force urging the piston and shuttle valve assembly downwardly against the influence of pressure within the pressure system being monitored. Repeatability and accuracy is further enhanced by the fact that the shuttle valve element need move only a slight distance from the annular sealing surface in order to allow full opening of a flow passage through the valve chamber which opening is at least equal to the dimension of the port through which the pilot fluid is to flow either during supply or venting. The pilot valve mechanism of the present invention also includes sealing elements for both the piston mechanism and the shuttle valve assembly which sealing elements are prevented by appropriate retainer means from being displaced by fluid pressure. Moreover, the seal assembly for the piston mechanism incorporates a relatively friction-free sealing element that is urged by an O-ring or other suitable urging means into proper sealed engagement with the wall structure of the bore within which the piston is movably disposed. The friction-free sealing element, because of its composition, will not tend to adhere to the wall structure of the piston bore and, therefore, will not influence operating characteristics of the valve mechanism.

In view of the foregoing it is apparent that the present invention is one well adapted to attain all of the objects hereinabove set forth, together with other advantages which will become obvious and inherent from a description of the apparatus itself. It will be understood that certain combinations and subcombinations are of utility and may be employed without reference to other features and subcombinations. As many possible embodiments may be made of this invention without departing from the spirit or scope thereof, it is to be understood that all matters herein set forth or shown in the accompanying drawings are to be interpreted as illustrative and not in a limiting sense.

What is claimed is:

1. A quick bleeding pressure responsive pilot valve mechanism for rapidly bleeding a pilot controlled control pressure system responsive to sensing of an unsafe condition in a pressurized primary system, said pilot valve mechanism comprising:
   a valve body having a longitudinal chamber defined therein, said longitudinal chamber being disposed in direct fluid communication with said pressurized primary system, said valve body having a valve chamber therein and defining opposed internal seat surfaces within said valve chamber;
   piston means being disposed within said longitudinal chamber and being movable responsive to variations in pressure within said pressurized primary system, said piston means having first shuttle valve support means formed thereon;
   a tension spring system being retained within said body and opposing movement of said piston means and yielding in proportion to the pressure of said pressurized system acting upon said piston means and allowing pressure responsive proportional movement of said piston means, said tension spring system having second shuttle valve support means;
   inlet, outlet and vent ports formed in said valve body and communicating with said valve chamber;
   a shuttle valve being disposed for free, pressure responsive movement within said valve chamber, said shuttle valve having opposed ends supported between said first and second shuttle valve support means, being linearly movable in one direction by said piston means and being linearly movable in the opposite direction by said spring system, said shuttle valve having an enlarged portion disposed between said internal seat surfaces; and
   seal means being supported at each extremity of said enlarged portion of said shuttle valve and being movable into sealing engagement with respective ones of said opposed seat surfaces to seal said outlet port from said inlet port and establish communication between said outlet and vent ports in the position of said shuttle valve and to seal said outlet port from said vent port and establish communication between said inlet and outlet ports in the opposite position of said shuttle valve, said seat surfaces being so spaced, in relation to the spacing of said seal means, that upon touching engagement between one of said seal means and one of said seat surfaces, the other seal means will be disposed in closely spaced relation with the opposite one of said seat surfaces.

2. A pilot valve mechanism as recited in claim 1, wherein:
said seat surfaces are annular edges defined by intersection of planar surfaces with a bore; and
said seal means is receivable in sealing relation within said bore.

3. A pilot valve mechanism as recited in claim 1, wherein said enlarged portion of said shuttle valve defines seal retaining means at each extremity of said enlarged portion and said seal means comprise:
a pair of annular sealing elements being retained by said seal retaining means in spaced relation and positioned for contact with respective ones of said seat surfaces.

4. A pilot valve mechanism as recited in claim 1, wherein;
said seat surfaces are defined by opposed planar sealing surfaces;
said seal means are O-ring type sealing elements that are moved into abutting sealing contact with respective ones of said planar sealing surfaces; and
means defined on said enlarged portion of said shuttle valve for limiting the amount of compression of said sealing elements are urged into sealing contact with said sealing surfaces.

5. A pilot valve mechanism as recited in claim 1, wherein said shuttle valve includes:
intermediate means having seal support surface means defined at each extremity thereof;
annular surface means being provided at each extremity of said intermediate means and defining annular seal retainer grooves located at the outer periphery of said intermediate means, said annular surface means including annular cam surface means; and
said seal means comprises a sealing element at each extremity of the enlarged portion of said shuttle valve retained within said respective ones of said seal retainer grooves and being urged toward said seal support surface means by said cam surface means.

6. A pilot valve mechanism as recited in claim 5, wherein:
said intermediate means is of generally cylindrical configuration;
said cam surface means comprises a pair of frusto-conical cam surfaces of smaller major diameter than the diameter of said intermediate means and are defined at each axial extremity of said intermediate means, said frusto-conical cam surfaces are tapered inwardly toward said intermediate means; and
said seal means comprise annular sealing elements disposed about said cam surface surfaces, said sealing elements extending beyond the axial extremities of said intermediate means.

7. A pilot valve mechanism as recited in claim 1, wherein said piston means comprises:
an elongated piston being movably disoposed within said longitudinal chamber and having a projection at one extremity thereof;
an annular sealing band being disposed about said projection and having the outer periphery thereof disposed in sliding sealed engagement with the wall of said longitudinal chamber spaced annular inwardly projecting retainer flanges being defined at each extremity of said annular band and defining opposed internal cam surfaces; and
resilient O-ring means being disposed about and in sealing engagement with said projection and urging said annular sealing band means radially outwardly into said sealing engagement with said wall of said longitudinal chamber, said O-ring means being received between said flanges and engaging said annular cam surfaces.

8. A pilot valve mechanism as recited in claim 1, wherein said longitudinal chamber is defined in part by a generally cylindrical bore and said piston means comprises:
an elongated piston rod being movably disposed within said cylindrical bore and having a projection at one extremity thereof;
an annular sealing band being disposed about said projection and having the outer periphery thereof disposed in sliding sealed engagement with said cylindrical bore, said annular sealing band defining opposed annular internal retainer flanges at each extremity of said band;
an annular resilient ring being received about said projection and within said annular sealing band, said annular resilient ring urging said annular sealing band radially outwardly into sealing engagement with said bore, said annular internal retainer flanges retaining said annular sealing ring in assembly with said annular sealing band;
means retaining said resilient ring in assembly with said projection; and
means retaining said annular sealing band in assembly with said projection.

9. A pilot valve mechanism as recited in claim 8, including:
annular cam surface being defined on each of said retainer flanges each engaging said annular ring and urging said annular ring toward a position centrally of said annular sealing band, said cam surfaces preventing pressure displacement of said annular ring from said annular band.

10. A pilot valve mechanism as recited in claim 9, wherein: said annular ring is a resilient O-ring having the inner periphery thereof in sealing engagement with said projection and the outer peripheral portion thereof in sealed engagement with the inner periphery of said annular sealing band.

11. A pilot valve construction as recited in claim 1, wherein said spring system comprises:
a helical spring being carried by said valve body; and
an actuating stem being interposed between said shuttle valve and said helical spring and placing said helical spring in tension, said actuating stem defining said second shuttle valve support means, said helical spring imparting a force through said actuating stem to said shuttle valve tending to move said shuttle valve in one axial direction thereof.

12. A pilot valve construction as recited in claim 11, wherein:
an adjustment element is carried by said valve body;
a spring retainer element is carried in fixed relation by said adjustment element and receives one extremity of said helical spring in fixed relation therewith;

a spring actuator element is fixed to the opposite extremity of said helical spring and is movable relative to said adjustment element; and
said actuator stem is interposed between said shuttle valve and said spring actuator element.

* * * * *